United States Patent
Weng (10) Patent No.: US 6,778,479 B2
(45) Date of Patent: Aug. 17, 2004

(54) MEDIA RECOGNITION CONTROL METHOD FOR OPTICAL TYPES

(75) Inventor: Yih-Shin Weng, Hsin-Chu Hsien (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 153 days.

(21) Appl. No.: 10/064,411

(22) Filed: Jul. 11, 2002

(65) Prior Publication Data

US 2004/0008595 A1 Jan. 15, 2004

(51) Int. Cl.$^7$ ................................................ G11B 7/00
(52) U.S. Cl. .................. 369/47.55; 369/53.1; 369/53.2; 369/53.45; 369/59.1
(58) Field of Search ............................ 369/47.1, 47.46, 369/47.39, 47.41, 53.1, 53.11, 53.2, 53.22, 53.37, 53.41, 53.45, 59.1, 44.13, 47.55

(56) References Cited

U.S. PATENT DOCUMENTS

6,643,238 B2   11/2003   Nakajima ................ 368/53.22

Primary Examiner—Muhammad Edun
(74) Attorney, Agent, or Firm—Winston Hsu (57) ABSTRACT

A drive controller is capable of reading information from an optically encoded disk. The drive controller is made to attempt a first read operation from a first area of the optically encoded disk to generate a first data set. If the first read operation is successful, the drive controller then verifies that the first data set conforms to a first data format. A media type descriptor is obtained from the first data set if the first data set conforms to the first data format. A media type descriptor is obtained from a second data set read from a second area of the optically encoded disk if the first data set does not conform to the first data format, or if the first read operation is not successful.

12 Claims, 9 Drawing Sheets

Fig. 1 Prior art

| DVD-RW DVD-R for general ver 2.0 | DVD-R ver 1.0 DVD-R for authoring ver 2.0 | DVD+RW DVD+R | DVD-ROM | DVD-RAM |
|---|---|---|---|---|
| 2E400h R/RW Physical format infomation zone  *12* | | | | |
| 2F200h Control data zone (Embossed) | Control data zone | Control data zone | Control data zone (Embossed) | Control data zone (Embossed) |
| 2FE00h 30000h 31000h  14a Data area | 14b Data area | 14c Data area  14d | Data area | Data area  14e |

| R/RW Physical format information ECC ||
|---|---|
| Sector number | Description |
| 0 | Reserved |
| 1 | Manufacturing information |
| 2 | Physical format information |
| 3-15 | Reserved |

| Control data zone ECC | |
|---|---|
| Sector number | Description |
| 0 | Physical format information |
| 1 | Disc manufacturing information |
| 2-15 | Reserved |

| Byte \ Bit | 7 | 6 | 5 | 4 | 3 | 2 | 1 | 0 |
|---|---|---|---|---|---|---|---|---|
| | Common portion of physical format information ||||||||
| 0 | Media type |||| Part version ||||
| 1 | Disc size |||| Maximum rate ||||
| 2 | Reserved | Number of layers || Track path | Layer type ||||
| 3 | Linear density |||| Track density ||||
| 4-15 | Data area allocation ||||||||
| 16 | BCA flag | Reserved |||||||
| 17-2047 | Medium-unique data ||||||||

Fig. 7

| Media type value | Definition |
| --- | --- |
| 0000b | DVD-ROM |
| 0001b | DVD-RAM |
| 0010b | DVD-R |
| 0011b | DVD-RW |
| 1001b | DVD+RW |
| 1010b | DVD+R |
| Others | Reserved |

MEDIA RECOGNITION CONTROL METHOD FOR OPTICAL TYPES

BACKGROUND OF INVENTION

1. Field of the Invention

The present invention relates to optical media devices. More specifically, the present invention discloses a method that enables an optical media drive to detect, and hence configure for, the optical media that is disposed within the device drive.

2. Description of the Prior Art

Figure 1:
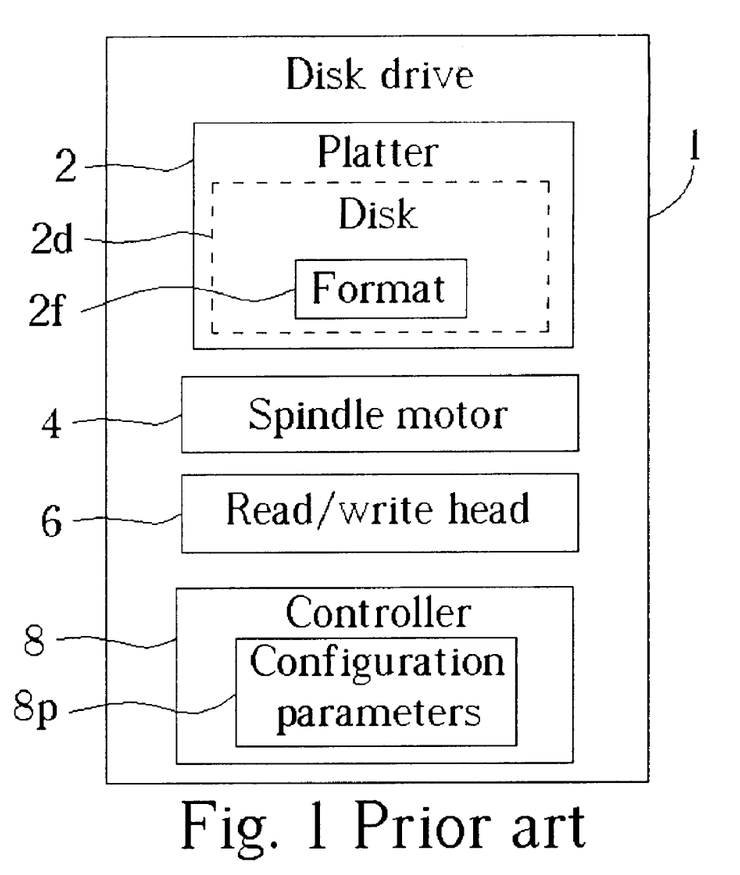
FIG. 1 is a simple block diagram of a prior art optical disk drive.

In the field of permanent memory storage systems, optical media, and the drives that are capable of reading the media, are currently offered in a plethora of standards. For example, the digital video disk (DVD) model includes DVD-ROM, DVD-RW, DVD+RW, DVD-R, DVD+R and DVD-RAM formats. Please refer to FIG. 1. FIG. 1 is a simple block diagram of a prior art optical disk drive 1. The disk drive 1 contains a platter 2 which is designed to accept an optical disk 2d. The disk 2d is a carrier for an optical media that has a particular optical media format 2f. As noted above, such formats can include DVD-ROM, DVD-RW, DVD+RW, DVD-R, DVD+R and DVD-RAM formats. A spindle motor 4 is used to spin the disk 2, and a read/write head 6 is used to read data from, or write data to, the disk 2d. A controller 8 controls both the spindle motor 4 and the read/write head 6. The controller 8 sets up various configuration parameters 8p that are related to the disk 2d to enable the drive 1 to properly and efficiently utilize the disk 2d. There is a great deal of overlap in terms of data structure on these various optical media formats 2f. For example, each of these formats 2f contains space allocated on the optical media of the disk 2d from physical sector number (PSN) 0x2F200h to PSN 0x2FE00h for a so-called Control Data Zone. There is, nonetheless, quite a bit of variation as well. For example, although space is allocated for the Control Data Zone, not all of these formats 2f will actually contain useful data in the Control Data Zone, which is true in particular of the DVD-RW format, and certain versions of the DVD-R format. Blank areas on the optical disk 2 will typically cause the read/write head 6 to hang when attempting to read such blank areas. Hence, an optical disk drive 1 that is expecting to read configuration data from the Control Data Zone may obtain a read failure, and hence hang, when attempting to read a DVD-RW disk 2d, as the Control Data Zone on DVD-RW type optical media formats 2f is frequently embossed blank. Moreover, the End PSN of the data area on an optical media can vary from disk 2d to disk 2d. Areas on the optical media beyond this End PSN are frequently blank, and so will causes the read/write head 6 to hang if it ventures into such areas in a read operation. It is therefore essential to get the End PSN for a disk 2d to prevent the read/write head 6 from attempting to read too far into the disk 2d, as such areas are typically blank, and thus can lead to hanging. However, the End PSN value will vary in location from media format 2f to media format 2f, further increasing the chances the drive 1 will have incorrect configuration parameters 8p, and hence be more prone to hanging. Finally, simply in terms of maximizing drive performance by tuning the drive 1 to the particular media format 2f that is currently being read from/written to (i.e., having proper configuration parameters 8p), it is essential that the drive 1 properly identify the media format 2f of the disk 2d in the platter 2.

SUMMARY OF INVENTION

It is therefore a primary objective of this invention to provide a media recognition control method that is applicable to optical disk drives, and which enables optical drives to properly detect, and hence configure for, various optical media types and formats.

Briefly summarized, the preferred embodiment of the present invention discloses a method for enabling a drive controller to recognize a media type. The drive controller is capable of reading information from an optically encoded disk. The drive controller is made to attempt a first read operation from a first area of the optically encoded disk to generate a first data set. If the first read operation is successful, the drive controller then verifies that the first data set conforms to a first data format. A media type descriptor is obtained from the first data set if the first data set conforms to the first data format. A media type descriptor is obtained from a second data set read from a second area of the optically encoded disk if the first data set does not conform to the first data format, or if the first read operation is not successful.

It is an advantage of the present invention that by performing sequential read operations from the disk in the prescribed manner, and by verifying that the read operations conform to an expected data format, the drive controller is able to properly identify the media type being utilized, and hence properly configure itself for the media being used, and avoid over-read operations into blank areas of the disk. Hanging of the drive is thereby prevented, and superior tuning for the disk being read from/written to is made possible.

These and other objectives of the present invention will no doubt become obvious to those of ordinary skill in the art after reading the following detailed description of the preferred embodiment, which is illustrated in the various figures and drawings.

DETAILED DESCRIPTION

Figure 2:
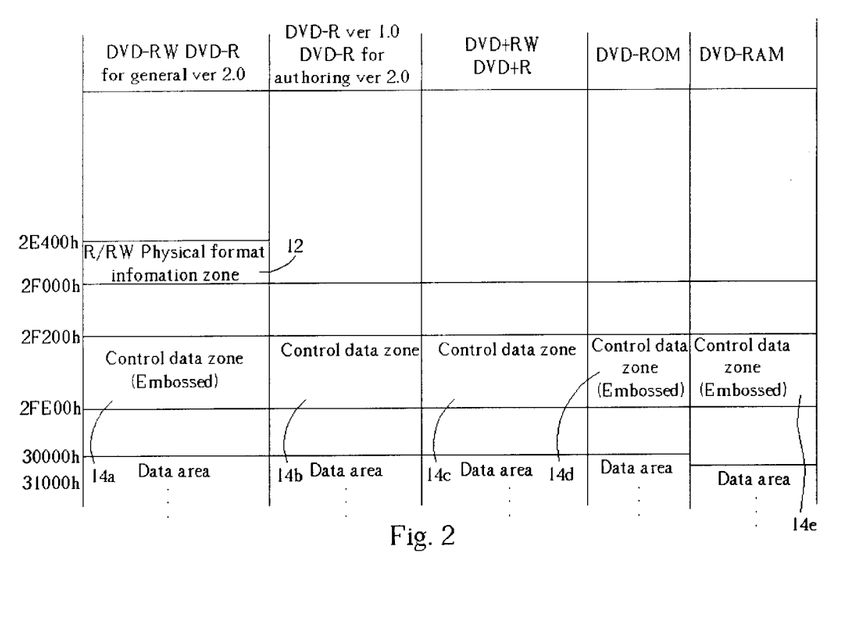
FIG. 2 is a physical sector number (PSN) map for various DVD format types.

Please refer to FIG. 2. FIG. 2 is a physical sector number (PSN) map for various digital video disk (DVD) media format types, including DVD-ROM, DVD-RW, DVD+RW, DVD+R, DVD-RAM and various DVD-R types. Two particular PSN ranges are of relevance to the present invention. The first is a PSN range from 0x2E400h to 0x2F000h, which contains a R/RW Physical format information zone 12 for both the DVD-RW media type, and the DVD-R for General version 2.0 media type. For these two media types, the zone 12 has a particular pre-defined data structure containing information pertinent to the media format type. In all other DVD media types, this zone 12 is filled with 0x00h. The second PSN range of interest spans from 0x2F200h to 0x2FE00h, which contains a Control Data Zone 14a, 14b, 14c, 14d and 14e, respectively, for the various indicated DVD media types. The Control Data Zone 14a–14e, if present, will also have a unique data structure, that is common across all the media types, and which contains information about the media format type. However, for certain media types (DVD-RW, and DVD-R for General version 2.0), Control Data Zone 14a may be embossed blank (i.e., 0x00h), embossed with prerecorded information, or may even be unreadable. Moreover, the meaning of certain data elements held within the Control Data Zones 14a–14e may vary from media type to media type.

Figure 3:
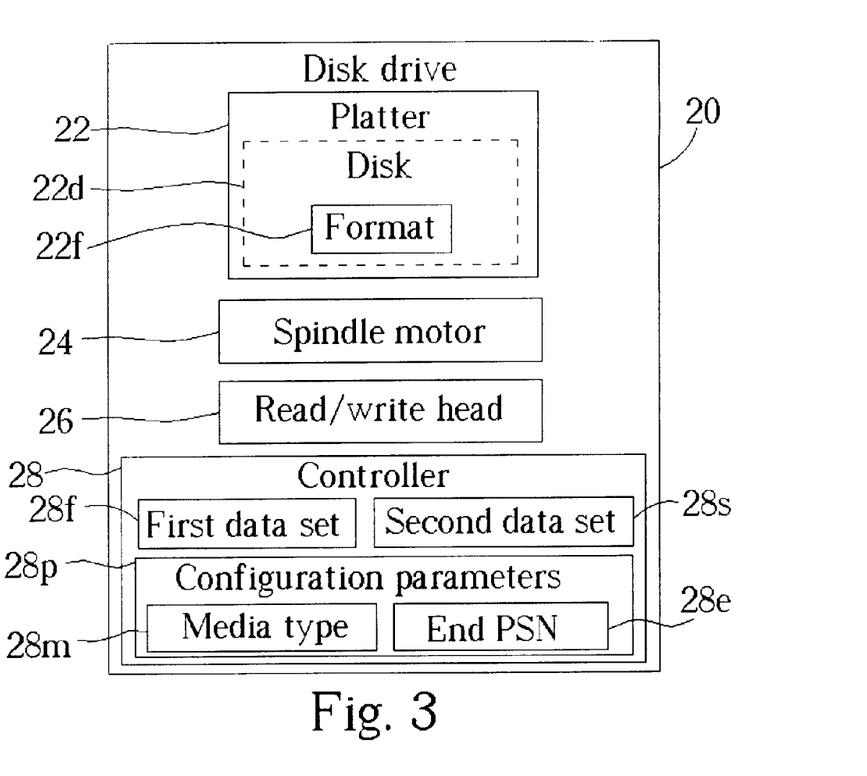
FIG. 3 is a simple block diagram of an optical disk drive according to the present invention.

Please refer to FIG. 3. FIG. 3 is a simple block diagram of an optical disk drive 20 according to the present invention. The drive 20 contains a controller 28 that is capable of implementing the method of the present invention (for example, a central processing unit with appropriate program code designed to perform the present invention method). The controller 28 controls a read/write head 26 and a spindle motor 24 to read data from, and write data to, a disk 22d held within a platter 22. The disk 22d may be removed from the platter 22 and replaced with another disk 22d having a different media format type 22f. The controller 28 utilizes the present invention method to setup configuration parameters 28p. In particular, the configuration parameters 28p contain a media type 28m that accurately reflects the media format type 22f of the disk 22d, and an End PSN 28e that holds the largest PSN that the read/write head 26 may access from the disk 22d without risk of hanging.

Figure 4:
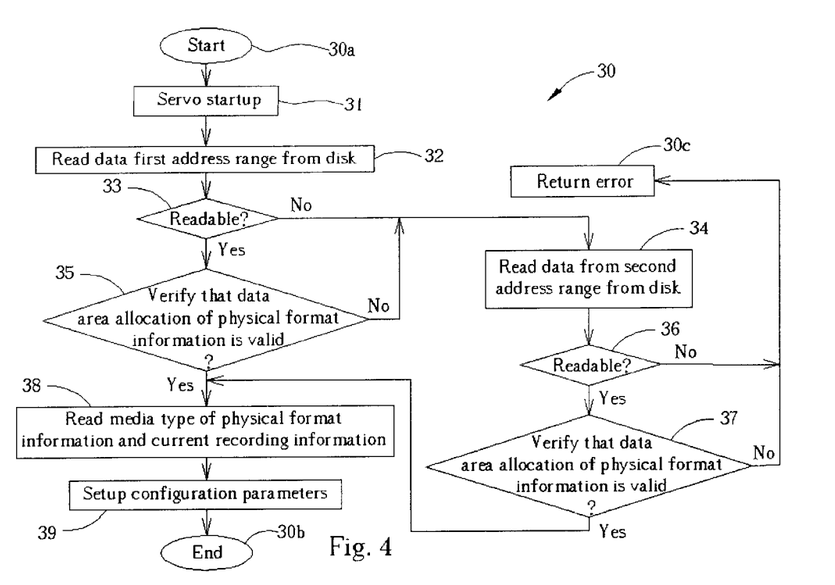
FIG. 4 is a flow chart for a preferred embodiment of the present invention.

Please refer to FIG. 4 with reference to FIGS. 2 and 3. FIG. 4 is a flow chart 30 for the preferred embodiment of the present invention. As a general characteristic, the present invention requires reading from a first PSN range on the disk 22d, optionally followed by a second read operation from the disk 22d. In the preferred embodiment process flow 30, the controller 28 first reads from PSN range 0x2E400h to 0x2F000h, which is termed the first address range in this embodiment, and then may optionally read from PSN range 0x2F200h to 0x2FE00h, which is termed the second address range in this embodiment. The steps illustrated in FIG. 4 are discussed below:

30a:
Start. A disk 22d, with a currently unknown media format type 22f, is placed within the platter 22 and is to be read from/written to by the disk drive 20.

30b:
End. Configuration parameters 28 hold values that properly indicate the characteristics of the disk 22d within the platter 22. The media format type 22f of the disk 22d is indicated by the media type 28m variable, and the last accessible PSN is indicated in the End PSN variable 28e. Read and write operations by the optical disk drive 20 should conform to the media type 28m (i.e., laser power levels, read/write head 26 tracking parameters, etc.), and the read/write head 26 should not attempt to read data beyond the End PSN 28e, so as to avoid hanging of the read/write head 26.

30c:
Return error. Unable to determine the media format type 22f of the disk 22d. Configuration parameters 28p are thus in an undefined state. This may be considered a general read error of the disk 22d, and the disk 22d may be considered completely unreadable.

31:
Servo startup. The controller 28 directs the spindle motor to spin up the disk 22d to an appropriate speed for a read operation from the first address range 0x2E400h 0x2F000h, and similarly controls the read/write head 26 to access from the first address range.

Figure 5:
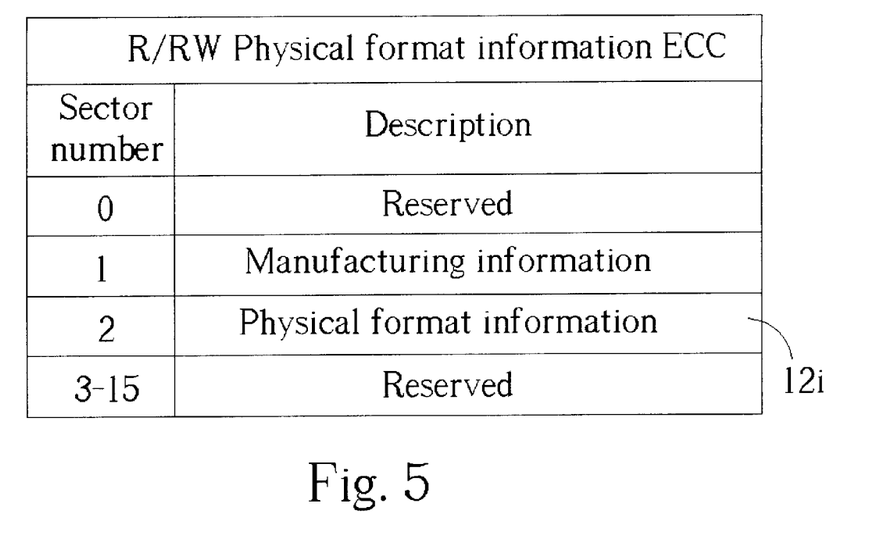
FIG. 5 is a sector map for each ECC block within a R/RW physical format information zone.

32:
Read data from first address range from disk. The controller 28 instructs the read/write head 26 to perform a first read operation to read information stored on the disk 22d from the first address range, i.e., PSN 0x2E400h to 0x2F000h, and to store this information as a first data set 28f. In particular, this first read operation is seeking to load, if available, a R/RW physical format information zone 12 that is found on all media format types 22f that conform to the DVD-RW and DVD-R for General version 2.0 standards. A R/RW physical format information zone 12 contains 192 (0xC0h) repeated ECC blocks. That is, each ECC block within the R/RW physical format information zone 12 is identical. Each ECC block contains 16 (0x10h) physical sectors, for a total of 0xC00h sectors (0x2F000h–0x2E400h=0xC00h). FIG. 5 is a sector map for each ECC block within the R/RW physical format information zone 12. Of particular relevance to the present invention is sector number 2 within each ECC block, which contains so-called Physical format information 12i. It is only necessary for the first read operation of the present invention to obtain the Physical format information 12i as found in the second sector of each of the 192 ECC blocks. Hence, so long as one of the ECC blocks within the R/RW physical format information zone 12 is readable and not corrupted, it should be possible to obtain the Physical format information 12i to serve as the first data set 28f.

33:
Readable? If the first read operation performed in step 32 was successful, then proceed to step 35. Otherwise, proceed to step 34. In general, the first read operation of step 32 should be successful, as all DVD media types 22f support at least some sort of readable data stored in the first PSN range of 0x2E400h to 0x2F000h (even if the data is nothing but a block of 0x00h data bytes). Thus, there should be no hanging of the read/write head 26 during this first read operation. For DVD-RW and DVD-R for General version 2.0, the first address range will contain the R/RW physical format information zone 12. In all other DVD media types, the first address range of 0x2E400h to 0x2F000h will simply contain all zeros (i.e., 0x00h). Hence, the first read operation in step 32 should be successful for all media format types 22f. Nevertheless, in the event of a read failure, a second read operation is performed in step 34. If the first read operation was successful, proceed to step 35. Otherwise, proceed to step 34.

Figure 6:
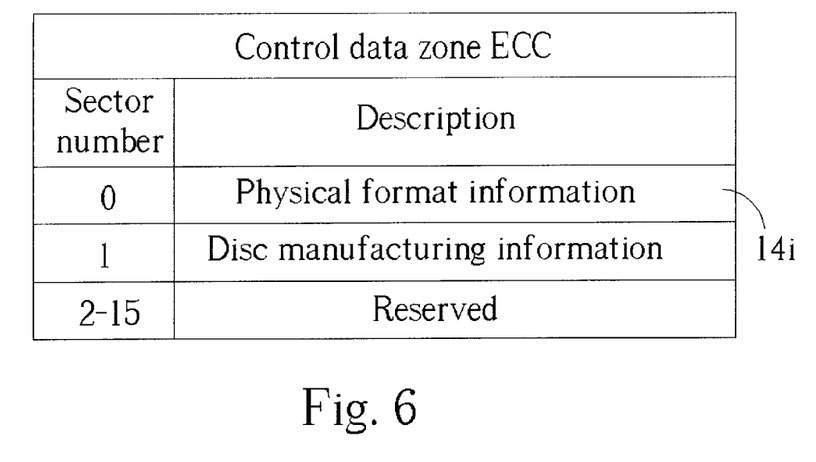
FIG. 6 is a sector map for each ECC block within a Control Data Zone.

34:
Read data from second address range from disk. The controller 28 instructs the read/write head 26 to perform a second read operation to read information stored on the disk 22d from the second address range, i.e., from PSN 0x2F200h to 0x2FE00h, and to store this information as a second data set 28s. The second address range corresponds to a Control Data Zone 14a–14e that is allocated for all media format types 22f. For DVD-RW and DVD-R for General version 2.0 media types 22f, the Control Data Zone 14a may, in fact, be unreadable. However, in these situations, the first read operation of step 32 should be successful, as well as the verification procedure of step 35 below, and so the process should not get to this step for such media types 22f. All other media types 22f, should support a successful read of their respective Control Data Zones 14b–14e. Each Control Data Zone 14a–14e contains 192 identical ECC blocks. FIG. 6 is a sector map for each ECC block within the Control Data Zone 14a–14e. In particular, the present invention method seeks to obtain sector number zero from any ECC data block within the Control Data Zone 14a–14e, which contains physical format information 14i. Any validly read physical format information sector 14i within the Control Data Zone 14a–14e will serve as the second data set 28s. Operationally, the second data set 28s may be the same memory area as the first data set 28f, so that the second data set 28s overwrites the first data set 28f, which eases implementation of step 38.

Figure 7:
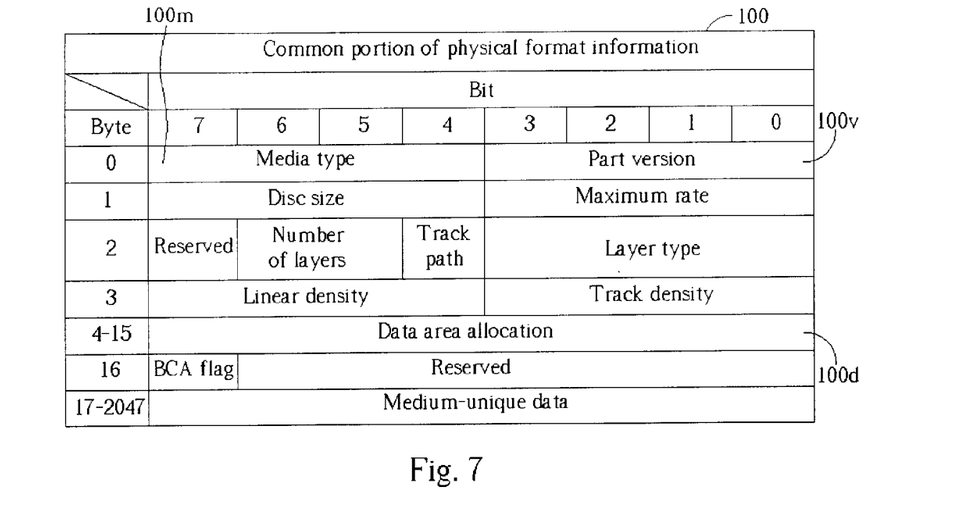
FIG. 7 is a data structure memory map of a portion that is common between a physical format information of a R/RW physical format information zone, and a physical format information of a Control Data Zone.
Figure 8:
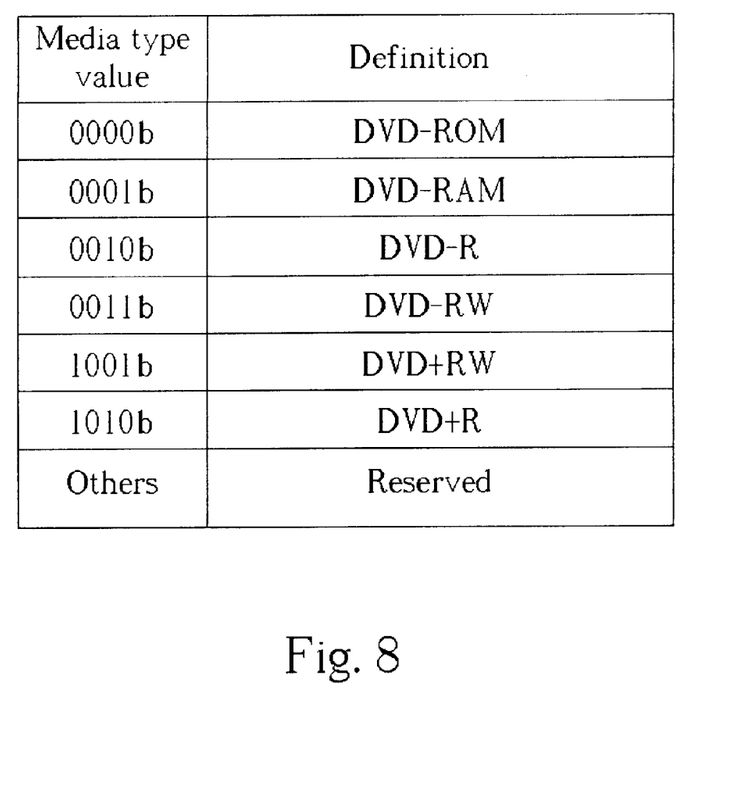
FIG. 8 is a table indicating the meaning of a binary value held within a media type field within the data structure of FIG. 7.

35:

Verify that area allocation of physical format information is valid. The controller verifies that the first data set 28f conforms to an expected first data structure. In this case for the preferred embodiment, the first data structure is the data structure expected from a properly configured physical format information block 12i within a R/RW physical format information zone 12. The physical format information 12i as found within sector two of a R/RW physical format information zone 12 ECC has a data structure that is common to the physical format information 14i as found within sector zero of a Control Data Zone 14a–14e ECC. This is convenient, as it eases implementation of the present invention method: a first validation check that verifies the validity of the first data structure of the first data set 28f may also be used, or easily modified, to verify the second data structure of the second data set 28s. That is, the first and second data structures are more or less the same, from the standpoint of checking their validity, with changes in expected values within fields of the common data structure 100 being the primary difference. FIG. 7 is a memory map 100 of the common data structure between the physical format information 12i and the physical format information 14i. Various methods may be used to verify that the first data set 28f contains a valid physical information block 12i. The simplest is suggested here. Bits four to seven of byte zero within the common portion 100 of the physical format information 12i define a media type field 100m, indicating the media format type 22f of the disk 22d. FIG. 8 is a table indicating the meaning of various binary values held within the media type field 100m. Bits zero to three of byte zero define the version number 100v. Hence, with fields 100m and 100v of byte zero, the controller 28 should be able to completely identify the media format type 22f of the disk 22d. For the first data set 28f to properly conform to the first data structure (which is the data format expected of a R/RW ECC physical format information block 12i), byte zero of the first data set 28f should indicate either a DVD–RW media type, or a DVD–R for General version 2.0 media type, as only these two media format types 22f support the physical format information 12i as found in the R/RW physical format information block 12. If the media type 100m and version 100v within the first data set 28f properly indicate DVD–RW or DVD–R for General version 2.0, then as a further validation check, the controller 28 may check a Data Area Allocation region 100d by checking bytes four through seven. Byte four of the common portion 100 of the physical format information 12i should be 0x00h, and bytes five through seven be 0x30000 or 0x31000. If all of these conditions are met, then it may be assumed that the first data set 28f conforms to the first data structure, which would be expected of a properly configured physical format information block 12i within a R/RW physical format information zone 12. If this verification step is successful, proceed to step 38. Otherwise, proceed to step 34.

36:

Readable? Was the second read operation, which attempted to load a Control Data Zone 14a–14e physical format information sector 14i as the second data set 28s, a successful read operation? If so, proceed to step 37. If not, proceed to step 30c.

37:

Verify that area allocation of physical format information is valid. This step is analogous to step 35. The second data set 28s is checked to see if it conforms to an expected second data structure, which in the preferred embodiment is a data structure consistent with a Control Data Zone 14a–14e physical format information block 14i. Within the second data set 28s, the Data Area Allocation 100d may be checked as in step 35, with the added provision that bytes five through seven may also be 0x30000 or 0x31000, while the media type 100m and version 100v should indicate any DVD media format type 22f except DVD–RW media types, or a DVD–R for General version 2.0 media type. Alternatively, simply checking the Data Area Allocation field 100d may be considered sufficient (i.e., that byte four is 0x00h, and bytes five through 7 are 0x30000 or 0x31000). Whatever verification process used, if the second data set conforms to the second data structure, then proceed to step 38. Otherwise, proceed to step 30c.

38:

Either the first data set 28f or the second data set 28s is used to set the configuration parameters 28p in the following. If coming from step 35, then utilize the first data set 28f. Otherwise, utilize the second data set 28s. As the first and second data structures of the first data set 28f and the second data set 28s, respectively, are common, it is possible to implement the method such that the memory location used to store the first data set 28f is identical to that used for the second data set 28s. In this case, there is no need to "remember" process flow. The same data set may be used under all cases by the current step 38, and this data set will inherently contain either the first data set 28f or the second data set 28s, depending upon the process flow. In either case, from the data set 28f, 28s being utilized, which has the common data structure 100, extract the media type 100m and the version number 100v from byte zero of the common data structure 100, and set the configuration parameter 28p media type 28m accordingly. That is, the media type 28m should unambiguously indicate the media format type 22f of the disk 22d according to byte zero of the common data structure 100. Then, extract bytes 9 through 11 of the common data structure 100 to set the End PSN value 28e. Note that if coming from step 35, the End PSN value 28e will be a value obtained from a physical format information field 12i of a R/RW Physical format information ECC. On the other hand, if coming from step 37, then the End PSN value 28e is obtained from a Physical format information field 14i of a Control Data Zone ECC. Proceed to step 39.

39:

The configuration parameters 28p are set in the manner indicated in step 38. The controller 28 controls access to the disk 22d according to the configuration parameters 28p to maximize read/write efficiencies, and prevents the read/write head from performing a read seek beyond the End PSN 28e to prevent hanging.

Figure 9:
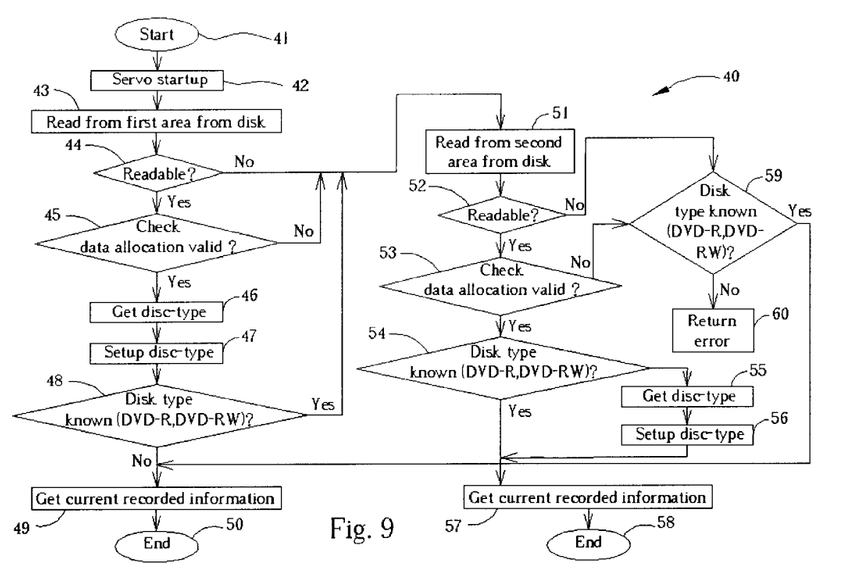
FIG. 9 is a flow chart for a second embodiment of the present invention.

Please refer to FIG. 9. FIG. 9 is a flow chart 40 for a second embodiment of the present invention. In the second embodiment, the first read operation reads from the address range 0x2F200h to 0x2FE00h. That is, the first area of the optical disk 22d is the Control Data Zone 14a–14e, which is read to obtain physical format information 14i to serve as the first data set 28f. A second read operation is subsequently conditionally performed to read from a second PSN range of PSN 0x2E400h to 0x2F000h. That is, the second area of the optical disk 22d is the R/RW Physical format information zone 12, to obtain therefrom a physical format information block 12i to serve as the second data set 28s. The following explains the steps of the second embodiment in more detail, bearing in mind that many of the steps performed in the following are very similar in nature to those of the first embedment method 30:

41:

Start. A new disk 22d is placed within the platter 22 for reading/writing. The configuration parameters 28 are placed into a default "unknown" state. In particular, the media type 28m and End PSN 28e both indicate "unknown" values.

42:

Servo startup. The spindle motor 24 and read/write head 26 are placed by the controller 28 into a condition suitable for reading from a first area of the disk 22d.

43:

Read from first area from disk. The controller 28 instructs the read/write head 26 to perform a first read operation to read data from a first area of the optical disk 22d. The first area lies within the PSN address range of 0x2F200h to 0x2FE00h, which corresponds to the Control Data Zone 14a–14e. In particular, from any ECC within the Control Data Zone 14a–14e, the controller 28 attempts to read sector zero from the ECC, which contains the physical format information 14i, and to use this physical format information 14i as a first data set 28f.

44:

Readable? Was the first read operation of step 43 successful? If not, proceed to step 51. Otherwise, proceed to step 45.

45:

Check data allocation valid. Verify that the first data set 28f, as obtained from step 43, has a first data structure that is consistent with the data structure expected of a physical format information block 14i, as obtained from a Control Data Zone 14a–14e ECC. This step is nearly identical to step 37 of the first embodiment method 30, except that the media type 100m and version information 100v of byte zero within the physical format information data structure 100 may indicate any valid, recognizable DVD media and version. As in step 37, the Data Area Allocation field 100d may be considered valid if byte four is 0x00h, and bytes five through 7 are 0x30000 or 0x31000. If the first data set is valid, then proceed to step 46. Otherwise, proceed to step 52.

46:

Get disk type. Extract the media type 100m and version type 100v from the common portion of the physical format information data structure 100, as contained in the first data set 28f. Proceed to step 47.

47:

Setup disk type. Utilize the media type 100m and version information 100v, as contained in the first data set 28f, to set the media type 28m in the configuration parameters 28. Subsequent disk 22d access procedures (laser power levels, read/write head 26 tracking, etc.) are performed in a manner consistent with the media type 28m. Proceed to step 48.

48:

Disk type known (DVD-R, DVD-RW)? Is the media type 28m indicative of the DVD-RW standard, or the DVD-R for General version 2.0 standard? If so, then a valid R/RW Physical format information zone 12 should be present on the disk 22d, and hence proceed to step 51. Otherwise, the disk 22d will not have a valid R/RW Physical format information zone 12, and so proceed to step 49.

49:

Get current recorded information. Utilize the first data set 28f, which contains the common portion of physical format information 100 as obtained from the Control Data Zone 14a–14e, to set the End PSN value 28e. The End PSN value 28e is obtained from bytes 9 through 11 of the common data structure 100.

50:

End. Configuration parameters 28 hold values that properly indicate the characteristics of the disk 22d within the platter 22. The media format type 22f of the disk 22d is indicated by the media type 28m variable, and the last accessible PSN is indicated in the End PSN variable 28e. Read and write operations by the optical media disk drive 20 should conform to the media type 28m (i.e., laser power levels, read/write head 26 tracking parameters, etc.), and the read/write head 26 should not attempt to read data beyond the End PSN 28e, so as to avoid hanging of the read/write head 26.

51:

Read from second area from disk. The controller 28 instructs the read/write head 26 to perform a second read operation to read data from a second area of the optical disk 22d. The second area lies within the PSN address range of 0x2E400h to 0x2F000h, which corresponds to the R/RW Physical format information zone 12. In particular, from any ECC within the R/RW Physical format information zone 12, the controller 28 attempts to read sector two from the ECC, which contains the physical format information 12i, and to use this physical format information 12i as a second data set 28s.

52:

Readable? Was the second read operation of step 51 successful? If not, proceed to step 59. Otherwise, proceed to step 53.

53:

Check data allocation valid. Verify that the second data set 28s, as obtained from step 51, has a second data structure that is consistent with the data structure expected of a physical format information block 12i, as obtained from a R/RW Physical format information 12 ECC. This step is nearly identical to step 35 of the first embodiment method 30, and involves verifying that the media type 100m and version number 100v are consistent with the DVD-RW or DVD-R for General version 2.0 standards, as well as verifying that byte four in the Data Area Allocation field 100d is 0x00h, and bytes five through 7 are 0x30000 or 0x31000. If the second data set 28s is valid, then proceed to step 54. Otherwise, proceed to step 59.

54:

Disk type known (DVD-R, DVD-RW)? Has the media type 28m in the controller 28 already been set by steps 46 and 47? If not, then proceed to step 55. Otherwise, proceed to step 58. As an option, it may be desirable to proceed to step 55 if the media type 28m indicates a DVD-RW format or a DVD-R for General version 2.0 format, as well as an "unknown" quantity, as such disks 22d with a valid first area and a valid second area may require different configuration parameters 28*p* than those disks 22*d* with invalid first areas and valid second areas. This would be subsequently considered by step 55.

55:

Get disk type. The disk 22*d* had an unusable first data area (i.e., the Control Data Zone 14*a*–14*e* was unusable), and a usable second data area (i.e., the R/RW Physical format information zone 12 was usable). Extract the media type 100*m* and version type 100*v* from the common portion of the physical format information data structure 100, as contained in the second data set 28*s*. Proceed to step 56.

56:

Setup disk type. Utilize the media type 100*m* and version information 100*v*, as found in the second data set 28*s*, to set the media type 28*m* in the configuration parameters 28. Subsequent disk 22*d* access procedures (laser power levels, read/write head 26 tracking, etc.) are performed in a manner consistent with the media type 28*m*. Proceed to step 57.

57:

Get current recorded information. The disk 22*d* has a usable second data area, which is available in the second data set 28*s* (i.e., the R/RW Physical format information zone 12 is usable and is present as the second data set 28*s*). Utilize the second data set 28*f*, which contains the common portion of physical format information 100 as obtained from the R/RW Physical format information zone 12, to set the End PSN value 28*e*. The End PSN value 28*e* is obtained from bytes 9 through 11 of the common data structure 100. Proceed to step 58.

58:

End. Configuration parameters 28 hold values that properly indicate the characteristics of the disk 22*d* within the platter 22. The media format type 22*f* of the disk 22*d* is indicated by the media type 28*m* variable, and the last accessible PSN is indicated in the End PSN variable 28*e*. Read and write operations by the optical media disk drive 20 should conform to the media type 28*m* (i.e., laser power levels, read/write head 26 tracking parameters, etc.), and the read/write head 26 should not attempt to read data beyond the End PSN 28*e*, so as to avoid hanging of the read/write head 26.

59:

Disk type known (DVD-R, DVD-RW)? Has the media type 28*m* in the controller 28 already been set by steps 46 and 47? If not, then read and verification of both the first and second areas of the disk 22*d* have failed, and so proceed to step 60. Otherwise, the first area of the disk is valid (i.e., the physical format information 14*i* from the Control Data Zone 14*a*–14*e* is valid), is present as the first data set 28*f*, and so proceed to step 49. As an added check in this step, it is possible to proceed to step 60 if the media type 28*m* indicates a DVD–RW format or a DVD–R for General version 2.0 format, as such disks 22*d* should always have a usable second data area (i.e., a usable R/RW Physical format information zone 12).

60:

Return error. Attempt to determine the media format type 22*f* of the disk 22*d* has failed. Return a general read error for the disk 22*d*.

In contrast to the prior art, the present invention provides a method that can identify all presently known DVD media format types. The present invention first seeks to obtain media type information from a first area of the disk and, depending upon the results of this first read operation, attempts to obtain additional information from a second area of the disk. By fully and accurately identifying the media type of an optical disk, an optical disk drive is better able to perform internal calibrations and configuration settings to ensure the best possible read/write performance with regards to the disk. Performance and reliability of the disk drive are thus improved for all known DVD media format types.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for enabling a drive controller to recognize a media type, the drive controller capable of reading information from an optically encoded disk, the method comprising:

causing the drive controller to attempt a first read operation from a first area of the optically encoded disk to generate a first data set, the first read operation reading the first data set being data stored in a first physical sector number range of the optically encoded disk;

verifying that the first data set conforms to a first data structure if the first read operation is successful;

obtaining a media type descriptor from the first data set if the first data set conforms to the first data structure; and obtaining a media type descriptor from a second data set read from a second area of the optically encoded disk if the first data set does not conform to the first data structure or the first read operation is not successful.

2. The method of claim 1 further comprising obtaining current recording information from the first data set if the first data set conforms to the first data structure.

3. The method of claim 2 further comprising obtaining current recording information from the second data set if the first data set does not conform to the first data structure.

4. The method of claim 3 further comprising utilizing the current recording information to configure the drive controller.

5. The method of claim 4 further comprising causing the drive controller to attempt a second read operation from a second area of the optically encoded disk to generate the second data set only if the first data set does not conform to the first data structure or the first read operation is not successful, the second read operation reading the second data set being data stored in a second physical sector number range of the optically encoded disk.

6. The method of claim 5 wherein the first data area is located within the first physical sector number range being from 0x2E400 to 0x2F000, and the second data area is located within the second physical sector number range being from 0x2F200 to 0x2FE00.

7. The method of claim 1 further comprising causing the drive controller to attempt a second read operation from a second area of the optically encoded disk to generate the second data set, the second read operation reading the second data set being data stored in a second physical sector number range of the optically encoded disk.

8. The method of claim 7 further comprising verifying that the second data set conforms to a second data structure if the second read operation is successful.

9. The method of claim 7 wherein the second read operation is performed after verifying that the first data set does not conform to the first data structure or the first read operation is not successful.

10. The method of claim 7 wherein the second read operation is performed after obtaining a media type descriptor from the first data set, and the media type descriptor indicates that the optically encoded disk contains the second data set conforming to the second data structure in the second area.

11. The method of claim 10 wherein the first data area is located within the first physical sector number range being from 0x2F200 to 0x2FE00, and the second data area is located within the second physical sector number range being from 0x2E400 to 0x2F000.

12. The method of claim 11 further comprising obtaining current recording information from the second data area to configure the drive controller.

* * * * *